United States Patent [19]

Simon

[11] 4,056,252
[45] Nov. 1, 1977

[54] STRAIN-RELIEF BUSHING FOR CABLES AND THE LIKE

[76] Inventor: Hans Simon, Bruchausener Strasse 11, D-5463 Unkel (Rhine), Germany

[21] Appl. No.: 567,114

[22] Filed: Apr. 10, 1975

[30] Foreign Application Priority Data

Jan. 20, 1975   Germany ............................ 2502050

[51] Int. Cl.² ................................................ F16L 5/00
[52] U.S. Cl. .................................. 248/56; 174/153 G; 339/103 B
[58] Field of Search ........... 248/56; 174/65 G, 152 G, 174/153 G; 285/158; 339/103 R, 103 B, 103 M

[56] References Cited

U.S. PATENT DOCUMENTS

| 1,737,242 | 11/1929 | Hooley ............................ 16/2 X |
| 2,494,814 | 1/1950 | Huth ................................ 248/56 X |
| 2,566,060 | 8/1951 | Ells et al. ........................ 285/158 |
| 2,828,147 | 3/1958 | Peiffer .............................. 248/56 X |
| 3,167,292 | 1/1965 | Meyerowitz ...................... 248/56 X |
| 3,282,544 | 11/1966 | Brattberg ......................... 248/56 |
| 3,288,407 | 11/1966 | Downer et al. .................. 248/56 |
| 3,493,205 | 2/1970 | Bromberg ........................ 248/56 |
| 3,541,229 | 11/1970 | De Smidt ................... 339/103 M X |
| 3,639,677 | 2/1972 | Bain ............................ 285/158 X |
| 3,689,014 | 9/1972 | Fink ............................ 174/153 G X |
| 3,768,115 | 10/1973 | Hoffmann ...................... 248/56 X |
| 3,788,582 | 1/1974 | Swanquist ........................ 248/56 |

FOREIGN PATENT DOCUMENTS

| 624,999 | 1/1936 | Germany ...................... 339/103 R |
| 2,132,758 | 1/1973 | Germany ...................... 174/153 G |

Primary Examiner—Roy D. Frazier
Assistant Examiner—Rodney H. Bonck
Attorney, Agent, or Firm—Michael J. Striker

[57] ABSTRACT

A strain-relief bushing for cables, wires and the like has a body formed with an internal passage through which a cable or the like is adapted to extend, and which is bounded by a surface. A pressure exerting element exerts pressure upon the cable in the passage in a direction including an acute angle with the elongation of the passage and serves to press the cable against a portion of the aforementioned surface.

5 Claims, 16 Drawing Figures

STRAIN-RELIEF BUSHING FOR CABLES AND THE LIKE

BACKGROUND OF THE INVENTION

The present invention relates generally to a strain-relief bushing for cables and the like, and more particularly to such a bushing which is intended to be installed in a hole formed in a wall of a casing, housing or the like so that the cable can lead from the exterior to the interior of the housing, or vice versa.

Strain-relief bushings for this purpose are already known. Their purpose is that which has been briefly outlined above, and they have the additional function for relieving strain, i.e., of preventing damage to the cable or the equipment with which it is connected in the interior of the housing. In most instances prior-art bushings utilize a plug of rubber or synthetic plastic which the cable (the term hereafter intended to refer not only to cables per se but also to wires and similar conductors) is pushed and which are then squeezed against the cable compressing them via a threaded element. However, it has been found that this does not provide any significant strain-relief and, further does not meet electrical codes which exist in some countries.

Another prior-art approach utilizes a bushing having a plurality of double-conical clamping jaws of synthetic plastic material which are pressed against one another and against a cable by means of a threaded element. The strain-relief afforded by this arrangement is adequate but the arrangement is relatively complicated and it is composed of a plurality of individual elements which must not only be individually produced but which then cause problems in assembly, making the use of this arrangement quite labor-intensive. However, even this arrangement does not meet certain electrical codes.

Another prior-art construction is a bracket which extends across the cable and is screwed down at opposite lateral sides of the cable, being pulled against the latter in order to hold it in place and provide a strain-relief. It also requires a plurality of components and is labor-extensive in terms of the labor required to assemble the arrangement. Furthermore, this arrangement also does not meet the electrical codes of some countries.

In all prior-art arrangements clamping devices are used the vector of whose clamping pressure extends at right angles to the longitudinal axis of the cable. This means that if sufficient clamping force is exerted, the cable is bent to a U-shaped configuration where it is engaged, and if an axial force then is exerted upon the cable this will result in damage to the same. Such damage is frequently observed when these prior-art devices are used, and defects in the cable installation can be very dangerous.

SUMMARY OF THE INVENTION

Accordingly, it is a general object of this invention to overcome the disadvantages of the prior art.

More particularly, it is an object of the present invention to provide an improved strain-relief cable bushing which avoids the aforementioned disadvantages, is simple and inexpensive in construction, and can be readily and without difficulties installed.

A further object of the invention is to provide such a bushing which can be installed in a ready and fool-proof manner on a wall of an equipment housing or the like.

An additional object of the invention is to provide such a bushing wherein a counter force develops as an automatic result of stresses placed upon the cable, i.e., of pull which is exerted upon the cable.

A concomitant object of the invention is to provide a cable bushing which serves to retain the cable in the bushing and also serves to retain the bushing in the wall of an equipment housing or the like.

In addition it is an object of the invention to provide such a cable bushing which meets applicable national and international electrical codes.

In keeping with these objects and others which will become apparent hereafter, one feature of the invention resides in a strain-relief bushing for cables or the like which, briefly stated, comprises a body having an internal passage through which a cable is adapted to extend, and which is bounded by a surface. A pressure-exerting element is provided for exerting pressure upon the cable in the passage in a direction including an acute angle with the elongation of the passage for pressing the cable against a portion of the surface bounding the passage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Referring firstly to the embodiment in FIGS. 1 – 6 it will be seen that this shows one bushing according to the present invention. The bushing is provided at its outer side, that is at the side at which the cable exits, with a body 1 and at its inner side, that is at the side where the cable enters, with a mounting flange 2. The body 1 and the flange 2 are advantageously of one piece, being cast or otherwise produced of synthetic plastic material, and are connected with one another unitarily via a thin annular web 3. The web 3 constitutes the bottom of a circular groove 4 which is formed intermediate the body 1 and the flange 2.

Figure 6:
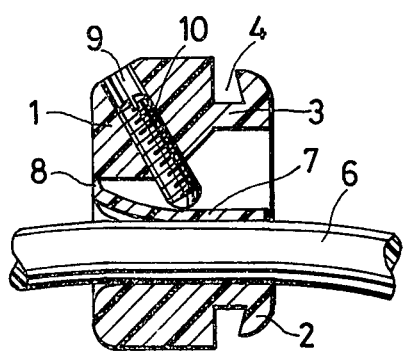
FIG. 6 is a longitudinal section through the bushing of FIGS. 1 – 4 with a cable clamped in place in it.
Figure 7:
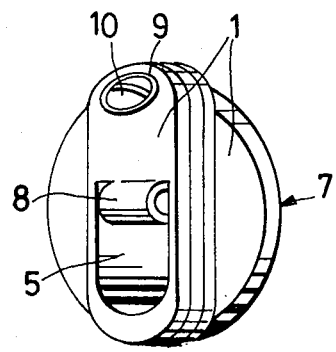
FIG. 7 is a front perpective showing a bushing according to a further embodiment of the invention.

A passage 5 is formed in the bushing and is adapted to accommodate a cable 6, as shown in FIG. 6. An inner intermediate wall 7 is provided which constitutes the upper boundary of the passage 5 and which extends essentially parallel to the longitudinal axis of the passage and is connected with the body 1 via a springy portion 8. The wall 7 is provided on its side facing inwardly of the passage 5 with an arcuate cylinder curved surface radius of curvature corresponds approximately to that of a cable 6 to be received in the passage 5. The relationship is advantageously chosen with respect to the average diameter cable 6 that can be received, not with respect to the smallest-diameter or the largest-diameter cable.

Figure 1:
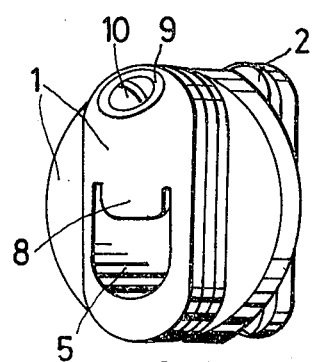
FIG. 1 is a front perspective illustrating a bushing according to one embodiment of the invention.
Figure 2:
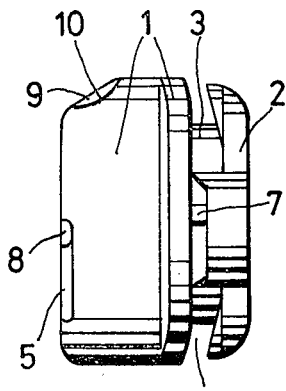
FIG. 2 is a side view of FIG. 1.
Figure 3:
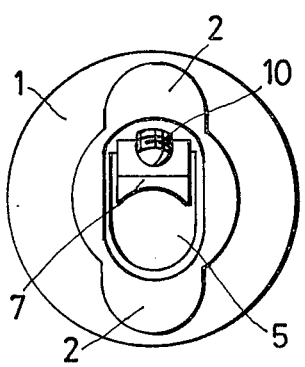
FIG. 3 is a rear view of the bushing in FIG. 1.
Figure 4:
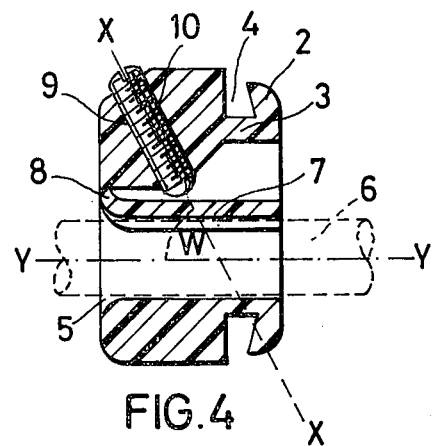
FIG. 4 is a longitudinal section of the bushing of FIG. 1.

An inclined bore 9 is formed in the body 1 and extends from the upper front of the body 1 to the passage 5. The longitudinal axis X—X of the bore 9 includes an acute angle W with the longitudinal axis Y—Y of the passage 5 and hence of the cable 6, as shown in FIG. 4. A pressure exerting screw 10 is threaded into the bore 9, which for this purpose may be tapped. If the synthetic plastic material of which the body 1 is made is of requisite characteristic, known to all those conversant with synthetic plastic materials, then the inner wall bounding the bore 9 can be smooth and have a somewhat smaller diameter than the screw 10, in which case the screw 10 will be of the self-tapping type which will form its own threads as it is being threaded into the bore 9.

In operation the cable 6 is pushed into the passage 5 and the screw 10 is tightened until it engages the intermediate wall 7 and presses the same against the cable 6, thereby pushing the cable 6 against the bottom surface bounding the passage 5. This results in the cable 6 being firmly clamped in place, as shown in FIG. 6, without undergoing any bending. The vector of the force exerted by the screw 10 upon the wall 7 and the cable 6 acts at an angle counter to the main direction of pull expected upon the cable. In the illustrated embodiment the angle W equals 60°, so that half the pressure force exerted by the screw 10 acts in a direction diametrally opposite to the direction of main pull expected to be exerted upon the cable 6.

This is a feature which is of great importance in actual use, because surprisingly and quite counter to the prior art wherein the total force of the clamping pressure acts, transversely to the elongation of the cable and is able to retain the cable sufficiently only if the cable is bent to more or less U-shaped configuration where it is engaged, with the attendant risks of damage, the arrangement according to the present invention clamps the cable 6 as firmly as if the cable 6 had been bent to a deep U-configuration, but without making it undergo such a deformation.

A further surprise is the fact that exertion of a clamping pressure at right angles to the longitudinal axis of the cable obtains in principle the same effect — due to the U-shaped deformation of the cable — as the exertion of an inclined pressure upon the cable in accordance with the present invention. In both instances, a part of the clamping pressure acts in direction counter to the main direction of pull upon the cable. In case of the deformation of the cable to U-shaped configuration, this action of the clamping force acts only in the region of the arms of the U-shaped configuration, where the pull upon the cable falls upon the deformed portion of the cable which is susceptible to damage. No force acting counter to the main direction of pull of the cable develops in the prior-art constructions unless the cable is deformed to substantially U-shaped configuration, because the total pressure force acts at right angles to the longitudinal axis of the cable and therefore has no component acting lengthwise of the cable.

In accordance with the present invention it is one of the most important aspects that the inclined pressure acting on the cable will not bend or otherwise deform the cable and does not damage it or shape it to a configuration in which it can become damaged when subjected to longitudinal pull. Pressure force required to retain and strain-relieve the cable is substantially smaller than in the prior art, because the force required in the prior art to effect deformation of the cable to substantially U-shaped configuration is not needed in the present invention.

Figure 5:
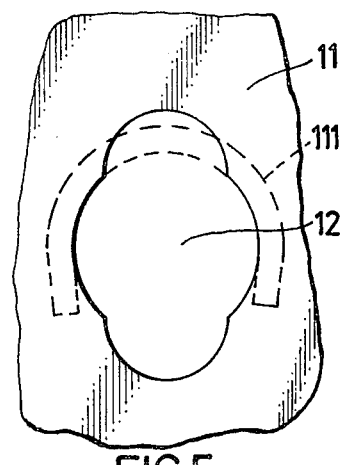
FIG. 5 is a front view of FIG. 1, installed in a wall of the housing.

The bushing in FIGS. 1 - 6 can be installed in a simple manner in the wall of a piece of equipment housing or the like. The wall is shown and identified with reference numeral 11 and is provided with a longitudinal cutout 12 which is shown in FIG. 5 and which has an outline corresponding to the circumference of the flange 2 and of the portion 3. The body 1 is inserted into this cutout 12 until it engages the wall 11. The flange 2 is positioned to be located to the rear side of the wall 11 and turned through 90° to its mounting position. It is assumed that the thickness of the portion 3 corresponds approximately to the thickness of the wall 11. Given the elastically yieldable characteristic of the bushing, and in particular the portions 1 and 2 thereof, the bushing is then reliably retained in the cutout 12. Should, as a matter of exception, the portion 3 be thicker than the wall 1 then a tensioning member can be inserted, which is diagrammatically and in broken lines shown in FIG. 5 and identified with reference numeral 111. It can be of sheet metal or synthetic plastic material, having U-shaped configuration and being pushed into the wall 11 and the flange 2 in straddling position.

Figure 8:
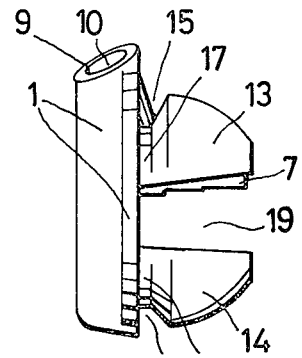
FIG. 8 is a side view of the bushing in FIG. 7.
Figure 9:
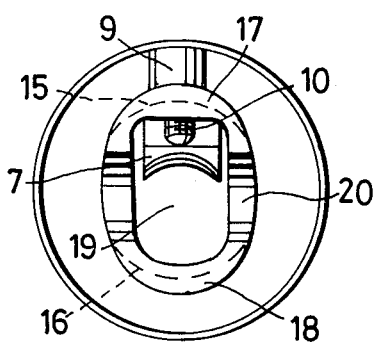
FIG. 9 is a rear view of the bushing in FIG. 7.

FIGS. 7 - 12 illustrate a further embodiment of the invention. Particularly FIG. 8 shows clearly that this embodiment again has a body 1 which resembles the body 1 of the preceding embodiment. The rearward part of the bushing in this case is formed of two clamping members 13, 14, each of part-conical configuration. These are of one piece with the body 1, advantageously of synthetic plastic material, and each of the members 13, 14 forms between itself and the body 1 a sickle-shaped groove 15 or 16, respectively. The bottoms of the grooves 15, 16 defined by the members 13, 14 are joined integrally with the body 1 via the web portions 17, 18. Wedge-shaped space 19 is formed between the members 13, 14 and extends to the vicinity of the front side of the body 1 where it is delimited by a relatively thin web 20.

This embodiment is of semi-rigid elastically yieldable synthetic plastic material and is capable of spring-action at the web 20 to a sufficient extent that the edges of the grooves 15, 16 formed in the members 13, 14 can just be pushed through a cutout 21 formed in a wall and whose circumference corresponds approximately to the circumference of a circle defined by the bottom walls bounding the grooves 15, 16. To mount this bushing in the wall the two members 13 and 14 are pushed towards one another and then pushed into the cutout 21 until they snap behind the rear side of the wall whose edge portion now extends into the grooves 15, 16. This is a very simple manner of mounting the bushing and is both reliable and rapid. If the bushing is properly installed, it will not wobble or otherwise move. If found necessary, a member 111 (described with respect to the preceding embodiment) can be employed for proper mounting.

Cable 6 is clamped as in the preceding embodiment, namely by means of the intermediate wall 7 and the screw 10. When the screw 10 presses upon the wall 7 and via the same upon the cable 6, it presses the cable 6 into engagement with the member 14 which is pushed downwardly. This in turn presses the web portion 18 firmly against the lower edge of the cutout 21, and as a reaction, serves to press the web portion 17 equally firmly against the upper edge of the cutout. The clamping pressure which is thus exerted upon the cable 6 also serves to reliably clamp the bushing in the cutout 21, thus performing a dual function.

The embodiment of FIGS. 7 – 12 can employ a very flat-dimensioned body 1, but if the body 1 is indeed very flat its recess 21 must be provided with an enlarged portion 211 to permit passage of the screw 10.

Figure 10:
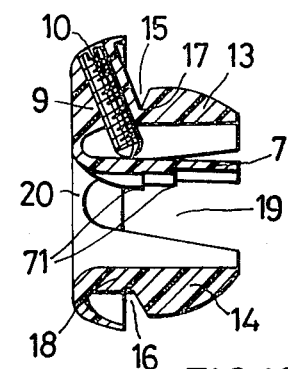
FIG. 10 is a longitudinal section through the bushing in FIG. 7.
Figure 12:
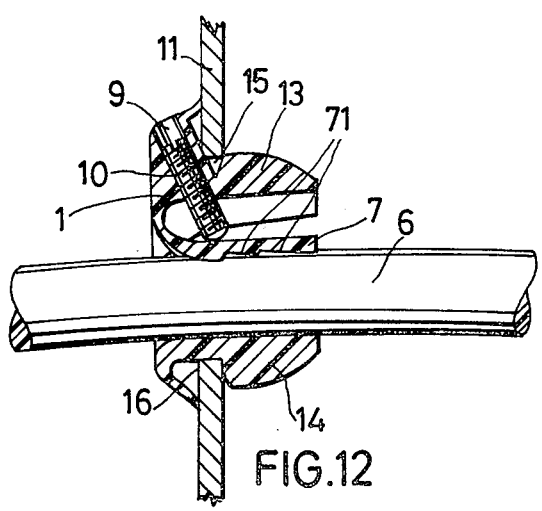
FIG. 12 is a longitudinal section showing the bushing of FIGS. 7 – 10 installed in a housing wall and clamping a cable in place.
Figure 13:
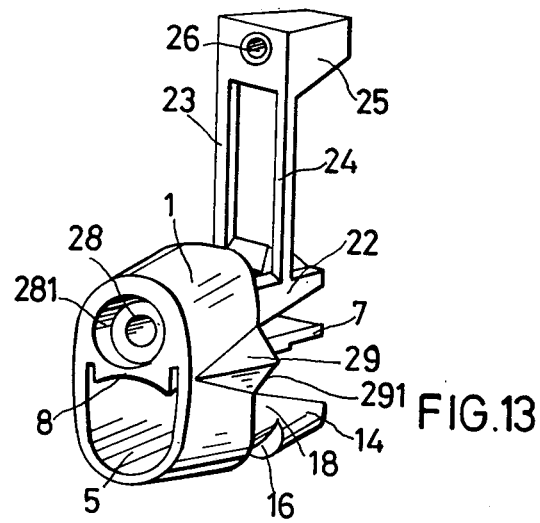
FIG. 13 is a perspective view illustrating a further embodiment of the invention.
Figure 14:
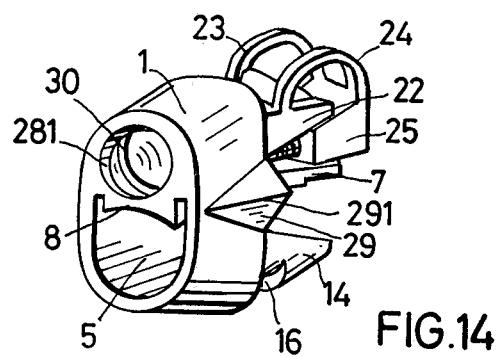
FIG. 14 is a perspective of view showing the bushing of FIG. 13 in assembled condition but without the cable in place.

The type of inner wall 7 which is shown in FIGS. 10 and 12 can be used in all embodiments herein. In the wall shown in FIGS. 10 and 12 the side of the wall 7 which faces the cable 6 is formed with recesses 71 extending transversely to the longitudinal axis of the passage 5 and the cable 6 and having a saw-tooth-shaped profile, so as to form corresponding projections surface portions of which extend at a small angle to the longitudinal axis of the passage 5 counter to the direction in which pull is expected to be exerted upon the cable 6. This arrangement is particularly advantageous in certain circumstances, for example in the case of hanging lamps or the like, where it is important to obtain as much retentive force upon the cable 6 as possible with the least possible clamping force. The feature just described cooperates ideally with the inclined screw 7 in such a manner that the clamping force exerted by the screw 10 acts at almost at right angles to the steep walls bounding the recesses 71. The height of the recesses must not exceed the thickness of the insulation of the cable 6.

Figure 15:
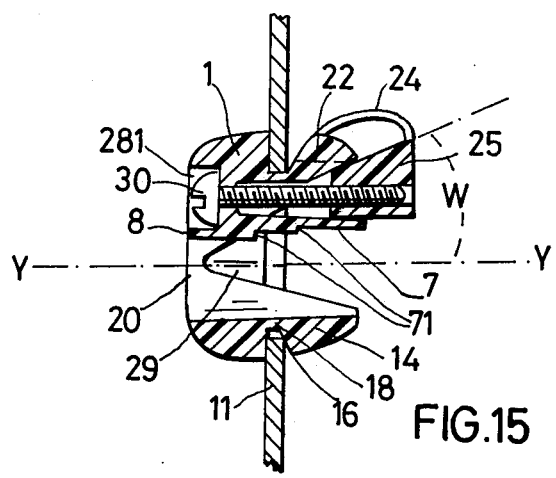
FIG. 15 is a longitudinal section of the bushing in FIG. 14, installed in a housing wall.
Figure 16:
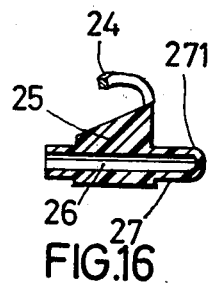
FIG. 16 is a section showing a detail of the bushing in FIGS. 13 – 15.

A further embodiment of the invention is illustrated in FIGS. 13 – 16. Here, the body 1 is again provided as before, but at its rear side there is formed a wedge-shaped portion 22 having an inclined surface which is directed towards the passage 5. At the upper side of this portion 22 there are formed two elastically yieldable arms 23, 24 at the end of which there is provided a wedge 25 with an inclined surface which faces towards the wedge 22 when the arrangement is in the starting position shown in FIG. 13. The wedge 25 is formed with an open-ended longitudinal bore 26 which receives an insulating sleeve 27 the bottom wall portion 271 of which is closed, as shown in FIG. 16.

The body 1 is provided with a wedge-shaped cap 19 as in the preceding embodiment, and with a springy web portion 20 which delimits the same, as particularly clearly shown in FIG. 15. Located opposite the portion 22 is a member 14 which is the same as in the preceding embodiment. Between the body 1 and the portion 22 on the one hand, and between the body 1 and the member 14 on the other hand, there are formed respective arcuate grooves 15, 16 as in the preceding embodiment, and also as in the preceding embodiment the inner wall 7 is provided together with screw 10. The body 1 is formed with a bore 28 which extends parallel to the passage 5 and has an end enlargement 281.

Figure 11:
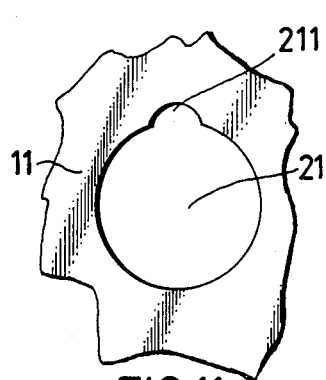
FIG. 11 is a front view showing an opening in a housing wall which is adapted to receive the bushing of FIGS. 7 – 10.

To install this embodiment the member 14 and the portion 22 are first pushed together and the bushing is then inserted into the cutout 21 of the wall 11, as shown in FIG. 11, whereupon the wall portions bounding the cutout 21 are allowed to snap into the grooves 15 and 16. At opposite lateral sides of the body 1, thin folding ribs 29 may be formed which overlap the gap 19 in part and which are each formed with outwardly extending fold 291.

After one has installed the bushing in this manner, the folding ribs 29 overlap the gap 19 adjacent the edge of the cutout 21.

Subsequently, the cable 9 is pushed through the bushing and the arms 23 and 24 bend downwardly until the wedge 25 can be inserted into the wedge-shaped space defined between the portion 22 and the wall 7. A screw 30 is inserted through the bore 28 of the body 1 and threaded into the bore 26 of the wedge 25, forcing the wedge 25 to move in the direction of the body 1 and causing the cable 6 to become clamped between the two inclined surfaces. In this embodiment it is preferred at this time that the bore 26 in the wedge 25 not be internally tapped, but that it be smooth so that the screw 30 will force its own thread. However, the bore can of course be internally tapped if this is desired.

The sleeve 27 can be advantageously formed as wedge 25 during the manufacture particularly if the wedge 25 is formed by injection molding, and thus be provided with the bore 26. The purpose of the sleeve 27 is to prevent conductive portions of the screw 30 from being exposed in the exterior of equipment with which the bushing is being used, and possibly cause a short. This is particularly important if the arrangement is used with household electrical equipment or for the installation of hanging lamps or the like.

In this last embodiment the counter force acting counter to the main direction of pull upon the cable is obtained in that pulling force acting lengthwise upon the cable frictionally draws the wedge 25 farther into the wedge-shaped space between portion 22 and the wall 7, so that a force component results at inclined surfaces of the portion 22 and the wedge 25 which acts counter to the direction of pull.

It will be understood that each of the elements described above, or two or more together, may also find a useful application in other types of constructions differing from the types described above.

While the invention has been illustrated and described as embodied in a strain-relief bushing for cables and the like, it is not intended to be limited to the details shown since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A strain-relief bushing for a cable or the like extending through an opening in a wall of a casing and being subjected to a longitudinal tension force, said bushing comprising a circumferentially complete body of an uninterrupted cross-section having an internal axial passage therethrough, through which a cable is adapted to extend and having an internal wall extending through said passage substantially parallel to the axis thereof and being connected only at one end to the remainder of said body, said internal wall being of one piece with said body and being movable only in a direction transverse to said axis, said body having a pair of opposite circular groove portions on the outer surface thereof located in a substantially common plane in which parts of said casing wall about said opening are engaged, said body having a threaded bore extending therethrough and so arranged that its axis encloses an acute angle with said axis of said axial passage and intersects said common plane of said groove portions; and a threaded pressure-exerting element extending through said bore and exerting pressure against said internal wall at said acute angle relative to the same and in a direction against said tension force to thereby press said internal wall against the cable and to press thereby one of said groove portions into a corresponding portion of said casing wall about said opening, creating thereby a reaction force which presses the opposite groove portion likewise into a corresponding portion of said casing wall to thereby clamp the cable in said axial passage and said bushing in said opening in said casing wall.

2. A bushing as defined in claim 1, wherein said element is a screw.

3. A bushing as defined in claim 1, wherein said body is formed with an internal wall located in said passage and adapted to be pressed against the cable by said element, said internal wall having retaining ribs extending transversely to the elongation of said passage and adapted to engage the cable.

4. A strain-relief bushing for a cable or the like extending through an opening in a wall of a casing and being subjected to a longitudinal tension force, said bushing comprising a body having an internal axial passage therethrough, said body having a front end and a rear end and being provided with a pair of rearwardly extending clamping portions each having an outer periphery formed with sickle-shaped groove portions located in a substantially common plane in which ports of said casing wall about said opening are engaged, said clamping portions each having an inner periphery defining a further wedge-shaped axial passage therebetween through which a cable is adapted to extend and which communicates with said internal axial passage, said clamping portions being connected in the region of said front end by an elastically yieldable web, said body having an internal wall extending through said passages substantially parallel to the axis thereof and being connected to said body only at said front end thereof, said clamping portions and said internal wall being of one piece with said body, said body having a threaded bore extending therethrough and so arranged that its axis encloses an acute angle with said axis of said passages and intersects said common plane of said groove portions; and a threaded pressure-exerting element extending through said bore and exerting pressure against said internal wall at said acute angle relative to said passages and in a direction against said tension force to thereby press said internal wall against the cable and to press thereby one of said groove portions into a corresponding portion of said casing wall about said opening, creating thereby a reaction force which presses the opposite groove portion likewise into a corresponding portion of said casing wall to thereby clamp the cable in said passages and said bushing in said opening of said casing wall.

5. A bushing as defined in claim 4, wherein said groove portions of said clamping portions each has a bottom wall portion, said clamping portions being movable between a proximate position and a distant position in dependence upon force to be applied thereto, and having the maximum common outer circumference in said proximate position corresponding to the common circumference of said bottom wall portions of said groove portions of said clamping portions in said distant position.

* * * * *